US006107579A

United States Patent [19]

Kinnemann

[11] Patent Number: 6,107,579

[45] Date of Patent: Aug. 22, 2000

[54] ARRANGEMENT FOR AUTOMATICALLY DETERMINING THE WEIGHT OF ITEMS OF POST

[75] Inventor: Georg Kinnemann, Koenigs-Wusterhausen, Germany

[73] Assignee: Siemens Aktiengesellschaft, Munich, Germany

[21] Appl. No.: 09/142,081

[22] PCT Filed: Jan. 29, 1997

[86] PCT No.: PCT/EP97/00379

§ 371 Date: Aug. 12, 1998

§ 102(e) Date: Aug. 12, 1998

[87] PCT Pub. No.: WO97/28907

PCT Pub. Date: Aug. 14, 1997

[30] Foreign Application Priority Data

Feb. 6, 1996 [DE] Germany ........................... 196 04 090

[51] Int. Cl.[7] .......................... G01G 13/02; G01G 19/00; B65G 47/12; B65H 5/00; B65H 29/68

[52] U.S. Cl. .......................... 177/145; 177/119; 198/447; 271/2; 271/69; 271/303

[58] Field of Search .................................... 177/119, 120, 177/121, 122, 145; 271/202, 258.01, 265.01, 270, 272, 303, 2, 69; 198/447

[56] References Cited

U.S. PATENT DOCUMENTS

| | | | |
|---|---|---|---|
| 4,019,620 | 4/1977 | Frenkel et al. | 198/447 |
| 4,901,808 | 2/1990 | Wu | 177/145 |
| 5,086,855 | 2/1992 | Tolson | 177/145 |
| 5,088,569 | 2/1992 | Checcucci | 177/145 |
| 5,228,550 | 7/1993 | Munch | 98/447 |
| 5,359,154 | 10/1994 | Tsukasa et al. | 177/145 |
| 5,393,939 | 2/1995 | Nasuta, Jr. et al. | 177/145 |
| 5,542,547 | 8/1996 | Ricciardi | 271/303 |
| 5,684,275 | 11/1997 | Tolson | 177/119 |
| 5,723,825 | 3/1998 | Dolan et al. | 177/145 |

OTHER PUBLICATIONS

Franklin et al., Feedback Control of Dynamic Systems, Addison–Wesley Publishing Co., Reading, Mass, pp. 88–93, May 1987.

*Primary Examiner*—Randy W. Gibson
*Attorney, Agent, or Firm*—Venable; Norman N Kunitz

[57] ABSTRACT

A device for automatically determining the weight of items of post comprising a feeding device (1) that contain conveyor belts that grip the postal items and conveys them in single file. A distributor (3) separates the incomming stream of items from the feeding device (1) into parallel conveying paths (TS) where they are weighed. The parallel conveying paths (TS) also contain belts which continue to grasp the postal items even as they are being weighed. Once the items are weighed, they are fed to a channelling device (4) which recombines the multiple streams of postal items from the parallel conveying paths (TS) into a single stream (2). The various conveyor belts in the various paths which grasp and convey the items of post are all run at the same speed as each other so that the original spacing between the postal items that was established while they were being conveyed by the feeding device (1) is retained while they are in the parallel paths (TS) so that the postal items can be recombined easily by the channelling device (4).

6 Claims, 3 Drawing Sheets

ARRANGEMENT FOR AUTOMATICALLY DETERMINING THE WEIGHT OF ITEMS OF POST

FIELD OF INVENTION

The present invention relates to an arrangement for the automatic determination of the weight of mail items.

BACKGROUND OF THE INVENTION

In automatic letter sorting systems, it is necessary for different applications to determine the weight of flat, flexible objects which tear easily and which have different lengths, e.g., C6 letters, DL letters, C5 letters, postcards, these objects are transported as a continuous stream, without stopping or delaying the objects. Difficulties can arise in that, the weight of the mail items must also be determined accurately and reliably when the mail items are transported at high speeds, e.g., above a speed of 2 m/s. Even at these speeds, the mail items must not be damaged. In addition, it is necessary that the mail items largely maintain their relative position with respect to one another in the continuous stream. In particular, the weight determination should not change the gaps between the mail items.

Methods have already been disclosed wherein the objects to be weighed are guided horizontally over a weighing system and are weighed dynamically during this process. At higher speeds, however, displacements occur between the objects because the objects are not firmly grasped by the conveying system; moreover, these arrangements do not allow high throughputs because, with small distances between the objects the individual objects do not remain in the weighing system long enough to determine the weight with sufficient accuracy. If there are only small gaps between objects of different lengths, the result is that short objects are not disposed in the weighing system by themselves, so that, in these cases, it is not possible to determine the weight of the small objects at all. To solve this problem, the stream of objects can be split into several partial streams and the individual objects fed to several weighing systems. In principle, this permits a higher overall throughput. However, the problem continues to exist that the individual objects of the partial streams can be displaced, so that such arrangements cannot be used for higher speeds. Furthermore, there is the risk that the objects to be weighed get damaged during the transition to the weighing system, especially if they are not rigid and stable enough.

BRIEF SUMMARY OF THE INVENTION

It is therefore the object of the present invention to propose an arrangement for the automatic determination of the weight of mail items. With such an arrangement a measurement can take place in the continuous stream while, even at higher speeds, displacements of the relative position of the mail items with respect to one another in the stream of items are avoided. The object is accomplished generally by an arrangement for the automatic determination of the weight of mail items, with a feeder arrangement and a discharge arrangement for the mail items as well as a plurality of weighing systems in which the feeder arrangement is connected to a distributing device through which the mail items can be supplied to the weighing systems. Further conveying paths are provided through which the mail items can subsequently be supplied to a combining arrangement and then to a discharge arangement. The mail items are transported in the conveying paths and in the weighing systems while being permanently grasped. A plurality of conveying paths are connected to the distributing device.

The arrangement according to the invention permits a higher overall throughput of mail items while ensuring greater weighing accuracy and operational reliability.

Advantageous embodiments of the invention can be taken from the dependent claims as well as from the descriptions [sic].

The invention is described below in greater detail by way of figures.

BRIEF DESCRIPTION OF THE DRAWINGS

FIG. 1 shows the block diagram of an arrangement according to the invention. The mail items are fed to a conveying path TS having a feeder arrangement 1, with the mail items being grasped permanently during the conveyance. This results in each individual item being fixed in its position in the conveying path TS with respect to the preceding and with respect to the subsequent mail item. The feeder arrangement 1 is connected via the conveying path TS preferably to a distributing device 3. In this distributing device 3, the mail items are distributed to a plurality of conveying paths TS and fed to the weighing systems $WS_1$, $WS_2$ . . . $WS_N$. In these conveying paths TS, the mail items are also permanently grasped and transported. Within the weighing systems $WS_1$, $WS_2$ . . . $WS_N$, the mail items are also permanently grasped and transported and they are subsequently transferred to conveying paths TS' and are fed to a combining arrangement 4 via these conveying paths TS'. Then the mail items are fed to a discharge arrangement 2. Since the mail items are permanently grasped and transported in the conveying paths and in the weighing systems, the relative distance of the mail items with respect to one another in the stream of items is the same during the feeding to the arrangement according to the invention as during the discharge.

FIG. 2 shows that, according to the invention, the conveying paths and the weighing systems are provided with twin band systems between which the mail items are clamped securely and are transported. Such a twin band system is comprised of two parallel extending belts which are guided over transport rollers and drive rollers 5–12. In all conveying systems TS, TS', mail items are transported to the weighing systems $WS_1$ . . . $WS_N$ with an identical predetermined speed, so that additional acceleration or deceleration forces do not occur at the transition points between conveying paths and weighing systems.

Figure 1:
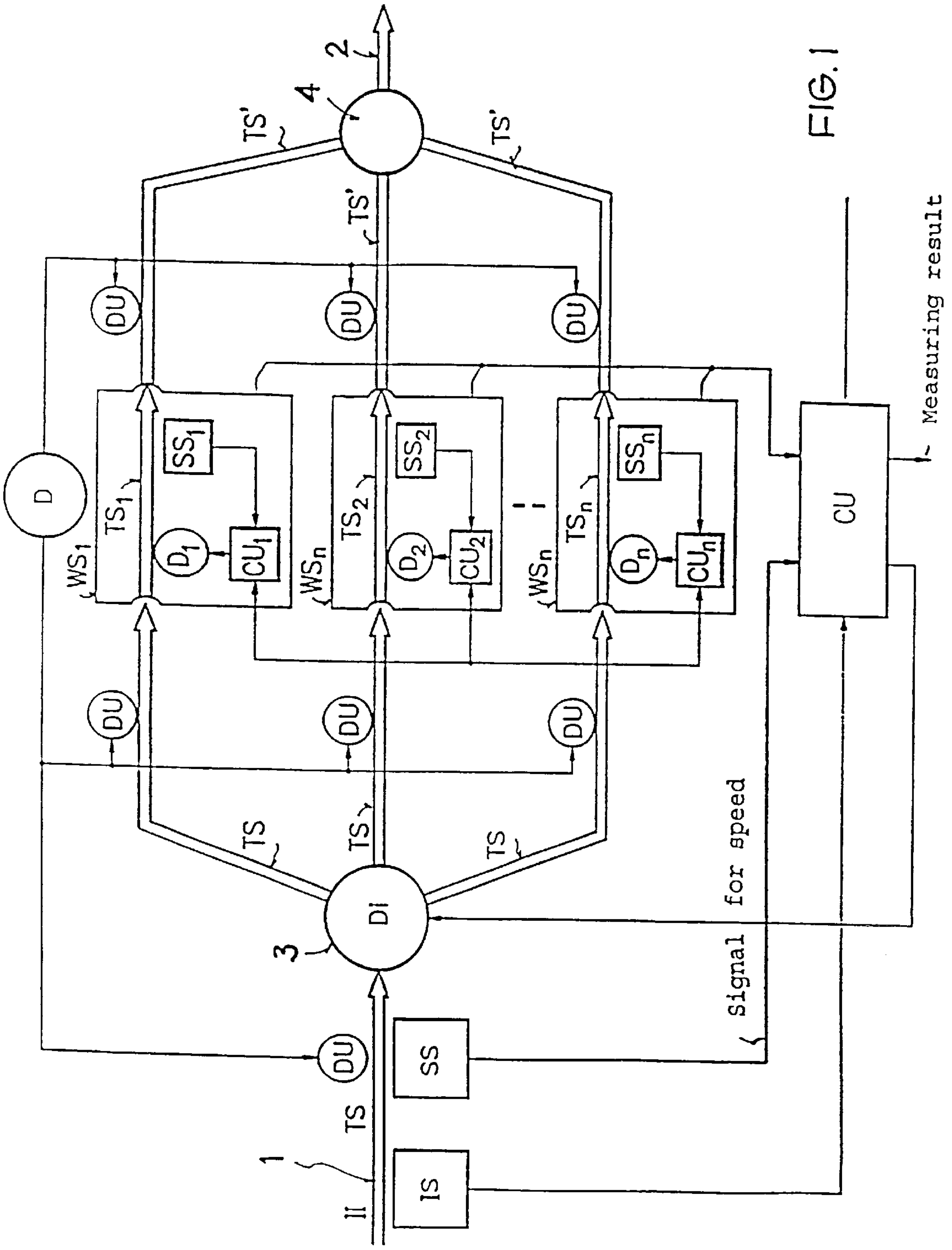
FIG. 1 is a block diagram of an arrangement according to the invention.
Figure 2:
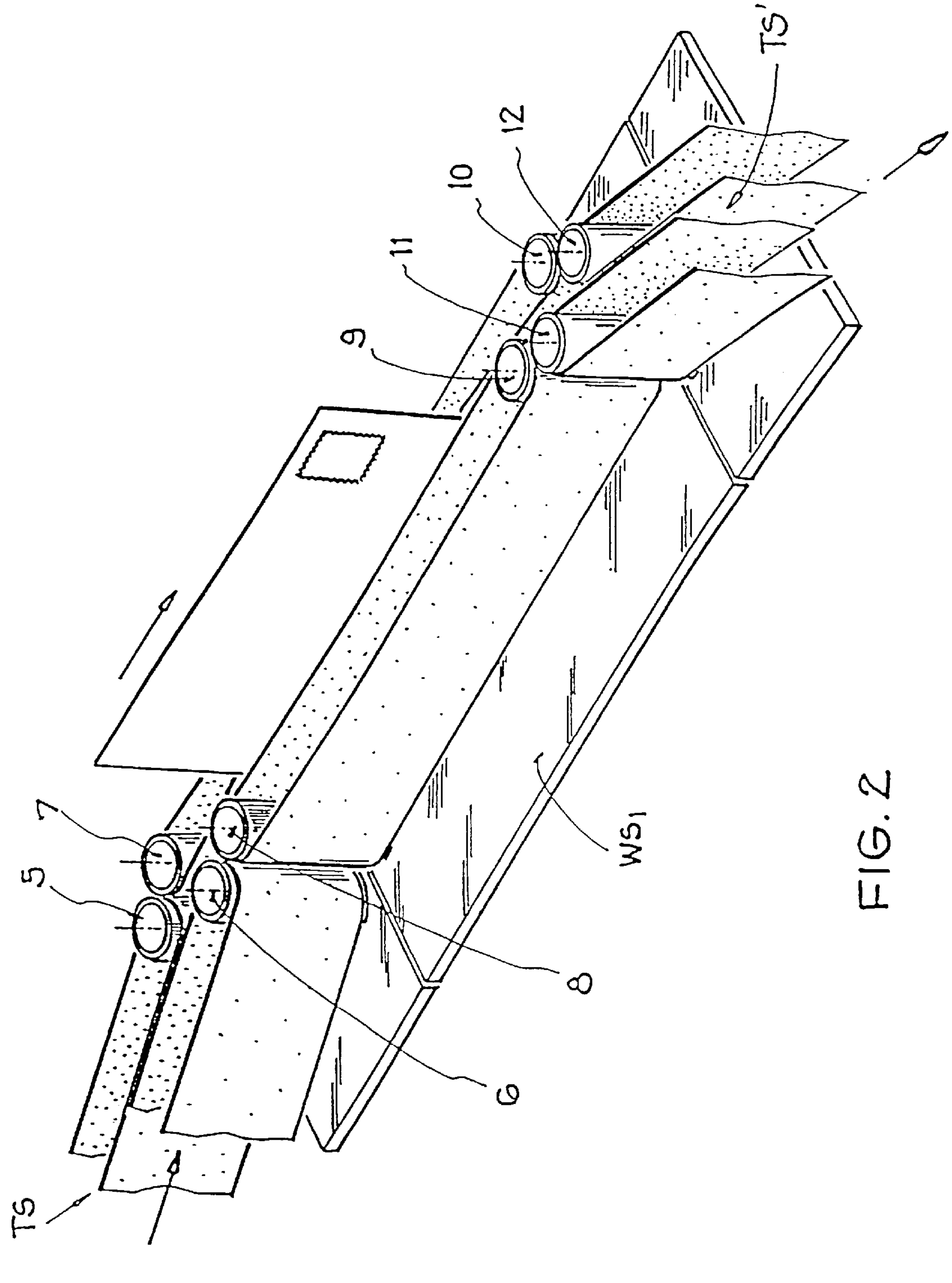
FIG. 2 is a detailed illustration of the conveyance through a weighing system according to the invention.

Preferably, each conveying path has a drive unit DU which is rigidly connected with a central drive D, e.g., a motor, so that the mail items are transported in all conveying paths, namely downstream as well as upstream of the weighing systems, with exactly the same speed, while this speed itself, however, is variable. The switching on and the switching off of the drive D as well as a possible speed control is effected by a control unit CU.

As was already mentioned, the mail items are transported in the weighing systems with exactly the same speed, if possible, as in the conveying paths through which the mail items are fed or to which the mail items are fed, so as to prevent damage of the mail items. However, during this process, a mechanical coupling between the conveying paths and the weighing systems must be avoided because, otherwise, the weighing systems would not be able to determine the weight accurately. According to the invention, therefore, each weighing system has a control unit $CU_1$, $CU_2$, . . . $CU_N$, to which a signal as a measure for the speed of the conveying paths TS or TS' is supplied by a speed sensor SS. Furthermore, each system has one sensor $SS_1$, $SS_2$, . . . $SS_N$, which determines the local conveying speed in the weighing system. The signal of these local speed sensors $SS_1$, $SS_2$, . . . $SS_N$ is supplied to the local control units $CU_1$, $CU_2$, . . . $CU_N$, respectively. Furthermore, each weighing system has a local drive $D_1$, $D_2$, . . . $D_N$ which is controlled by the control unit $CU_1$, $CU_2$, . . . $CU_N$ to the speed of the conveying paths TS, TS'. This permits a transfer of the mail items from the conveying paths TS into the weighing systems or from the weighing systems into the conveying paths TS' without the appearance of speed differences, even if the arrangement must be switched off at any desired moment during the operation.

The mode of operation of the arrangement according to the invention is as follows: mail items are supplied to the arrangement according to the invention by the feeder arrangement 1, they first pass an input sensor IS, e.g., a light barrier, which records each mail item and relays it to the control unit CU. The speed sensor SS determines the input speed of the mail items in the conveying path TS. This also permits the control unit CU to track each mail item during its passage through the arrangement since the whereabouts of each mail item can be determined by means of integration as a function of the time. The mail items are supplied to the distributing device 3 as a continuous stream and are distributed to the weighing systems $WS_1$ to $WS_N$. The individual weighing systems are mechanically decoupled from the remainder of the arrangement, so that their function is not impaired. The mail items are supplied to the conveying paths TS' during the passage through the weighing systems and they are recombined to again form a continuous stream in the combining arrangement 4, which stream leaves the arrangement via the discharge arrangement 2.

Figure 3:
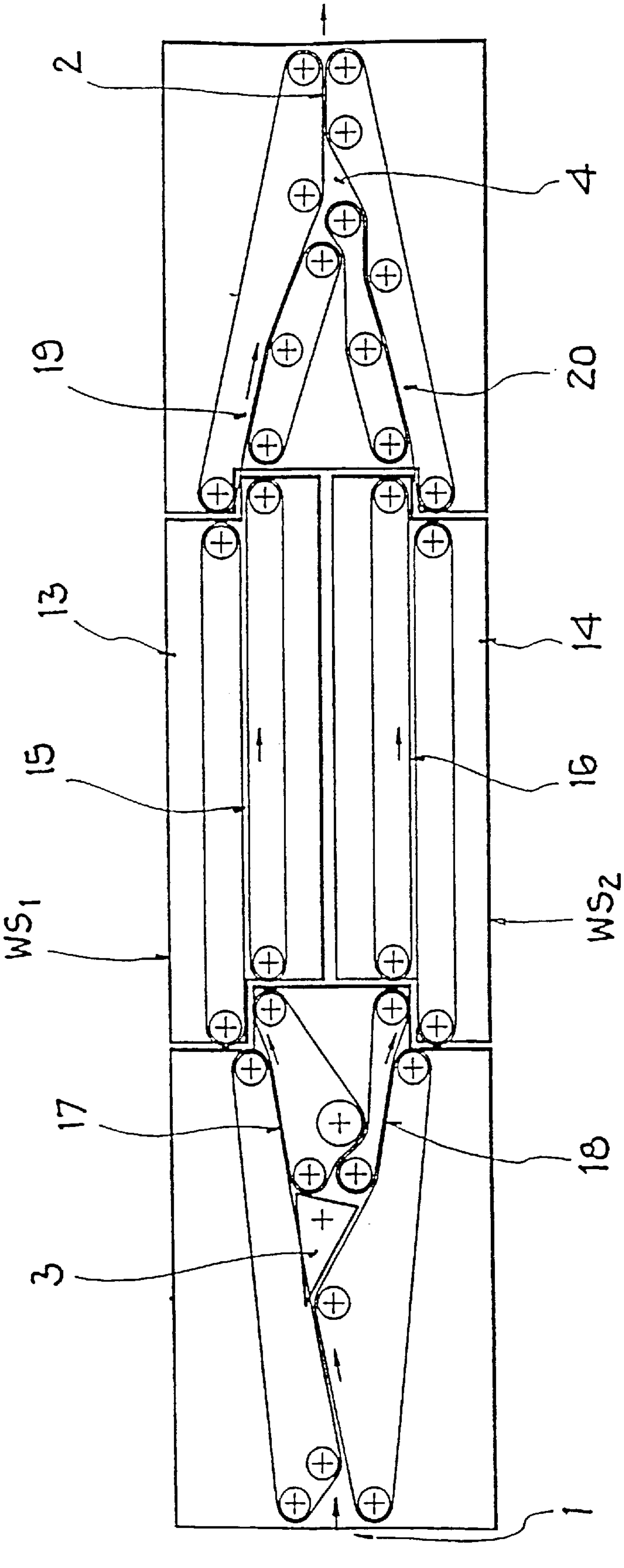
FIG. 3 is the layout for an arrangement according to the invention with two weighing systems.

FIG. 3 illustrates a preferred embodiment of the arrangement with two weighing systems. Each weighing system $WS_1$ or $WS_2$ is disposed on a base plate 13 or 14 which is mechanically decoupled from the remainder of the arrangement. Each weighing system is provided with a twin band system 15 or 16 which transports the mail items while their weight is being determined. The feeder arrangement 1 also has twin band systems. A switch is used as distributing device 3 to which the mail items are supplied via a first or second conveying path 17 or 18, respectively. These conveying paths are also realized by twin band systems. Following the transport within the weighing systems, the mail items are transferred to conveying paths 19, 20 which transport the mail items to the combining arrangement 4. These conveying paths as well as the combining arrangement are realized as twin band systems. The transfer points between the conveying paths and the weighing systems are preferably implemented by transport rollers which are offset with respect to one another, so that, on the one hand, a reliable transfer of the mail items is permitted, on the other hand, the weighing system is mechanically decoupled from the remainder of the arrangement.

The weighing systems themselves each have the above-cited features, namely, a drive, a control device, a speed sensor as well as a conveying path in which the mail items are transported while they are permanently grasped. Furthermore, one of the different known weighing principles is used for the implementation of the actual weighing process in the weighing systems.

What is claimed is:

1. An arrangement for the automatic determination of the weight of mail items, comprising:

- a high speed feeder arrangement;
- a distributing device connected to the feeder arrangement;
- a plurality of conveying paths connected to the distributing device to supply mail items to a respective plurality of weighing systems, with respective conveying paths and weighing systems having conveyors for gripping the mail items;
- a plurality of additional conveying paths for supplying mail items subsequently as output from the respective plurality of weighing systems to a combining arrangement and then to a discharge arrangement, with respective additional conveying paths having respective conveyors for gripping the mail items;
- a respective driving arrangement provided for each respective conveying path, with each respective driving arrangement being rigidly connected to a central drive to be driven at a same, predetermined speed; and
- a respective controlled drive for each weighing system causes mail items on the plurality of conveying paths and in the respective plurality of weighing systems to be conveyed and permanently gripped at the same, predetermined speed.

2. The arrangement according to claim 1, wherein the plurality of conveying paths and the plurality of weighing systems support the weight of the mail items through the respective gripping conveyors.

3. The arrangement according to claim 1, wherein the conveyors of the plurality of conveying paths, as well as of the respective plurality of weighing systems are provided as twin belt conveyor systems, between which the mail items are clamped and conveyed.

4. The arrangement according to claim 3, wherein the respective twin belt conveyor systems solely support the weight of the mail items.

5. The arrangement according to claim 3, wherein the mail items are conveyed in a horizontal direction by the twin belt conveyor systems that are vertical relative to the conveying direction.

6. The arrangement according to claim 1, wherein a speed sensor is provided in the region of the feeder arrangement and each weighing system has a local speed sensor wherein the signals from the speed sensors are used to control the drives of the respective weighing systems.

* * * * *